United States Patent
Koitabashi

(10) Patent No.: US 7,534,992 B2
(45) Date of Patent: May 19, 2009

(54) CONTACTLESS CONNECTOR FOR DATA TRANSMISSION INCLUDING ROTATING AND FIXED LIGHT ELEMENTS

(75) Inventor: Hiroyuki Koitabashi, Komaki (JP)

(73) Assignee: Chubu Nihon Maruko Co., Ltd., Aichi (JP)

( * ) Notice: Subject to any disclaimer, the term of this patent is extended or adjusted under 35 U.S.C. 154(b) by 75 days.

(21) Appl. No.: 11/361,559

(22) Filed: Feb. 23, 2006

(65) Prior Publication Data

US 2007/0069116 A1    Mar. 29, 2007

(30) Foreign Application Priority Data

Sep. 27, 2005    (JP) ............................. 2005-279631

(51) Int. Cl.
*G01D 5/34* (2006.01)
*G06M 7/00* (2006.01)
*H01J 3/14* (2006.01)

(52) U.S. Cl. .................... 250/231.13; 250/221; 250/216

(58) Field of Classification Search ..............................
250/231.13–231.18, 239, 363.02, 363.04, 250/221; 341/11, 13, 14

See application file for complete search history.

(56) References Cited

U.S. PATENT DOCUMENTS 5,828,146 A * 10/1998 Lorenz et al. ............. 310/68 D
6,828,919 B1 * 12/2004 Gold ...................... 340/870.29
2006/0118162 A1 * 6/2006 Saelzer et al. ............... 136/246

FOREIGN PATENT DOCUMENTS

| DE | 4428 790 C1 | 2/1996 |
| GB | 2 305 769 A | 4/1997 |
| JP | 61-24961 | 7/1986 |
| JP | 5-134140 | 5/1993 |
| JP | 59-160344 | 9/1994 |
| JP | 2002-075760 | 3/2002 |
| JP | 2004-116018 | 4/2004 |

* cited by examiner

*Primary Examiner*—Thanh X Luu
*Assistant Examiner*—Pascal M Bui-Pho
(74) *Attorney, Agent, or Firm*—Greer, Burns & Crain, Ltd.

(57) ABSTRACT

The present invention is a contactless connector that comprises a rotation-side light element that is provided on a rotating body of rotating about an axis of rotation and a fixed-side light element that is provided on a fixed body, data transmission and reception being contactlessly performed between the rotation-side light element and the fixed-side light element. The rotation-side light element and the fixed-side light element are provided on a disk face of the rotating body and a disk face of the fixed body respectively, which are substantially orthogonal to the axis of rotation, and provided oblique with respect to the respective disk faces to form a light path that is oblique with respect to the axis of rotation. The contactless connector further comprises an aperture that allows light emitted from the rotation-side light element or the fixed-side light element to pass, between the rotating body and the fixed body.

6 Claims, 11 Drawing Sheets

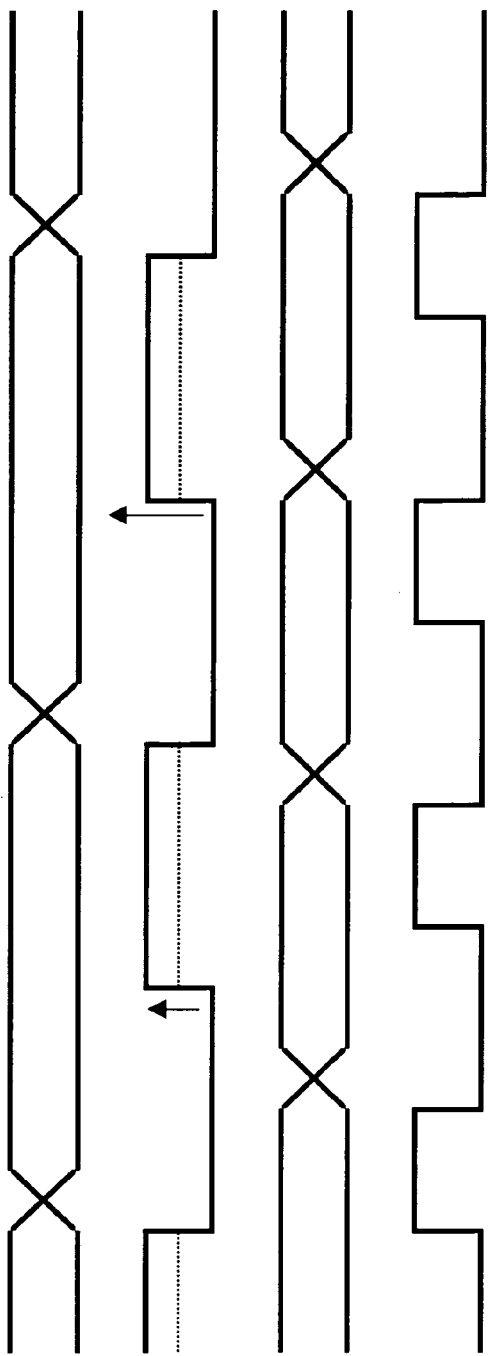

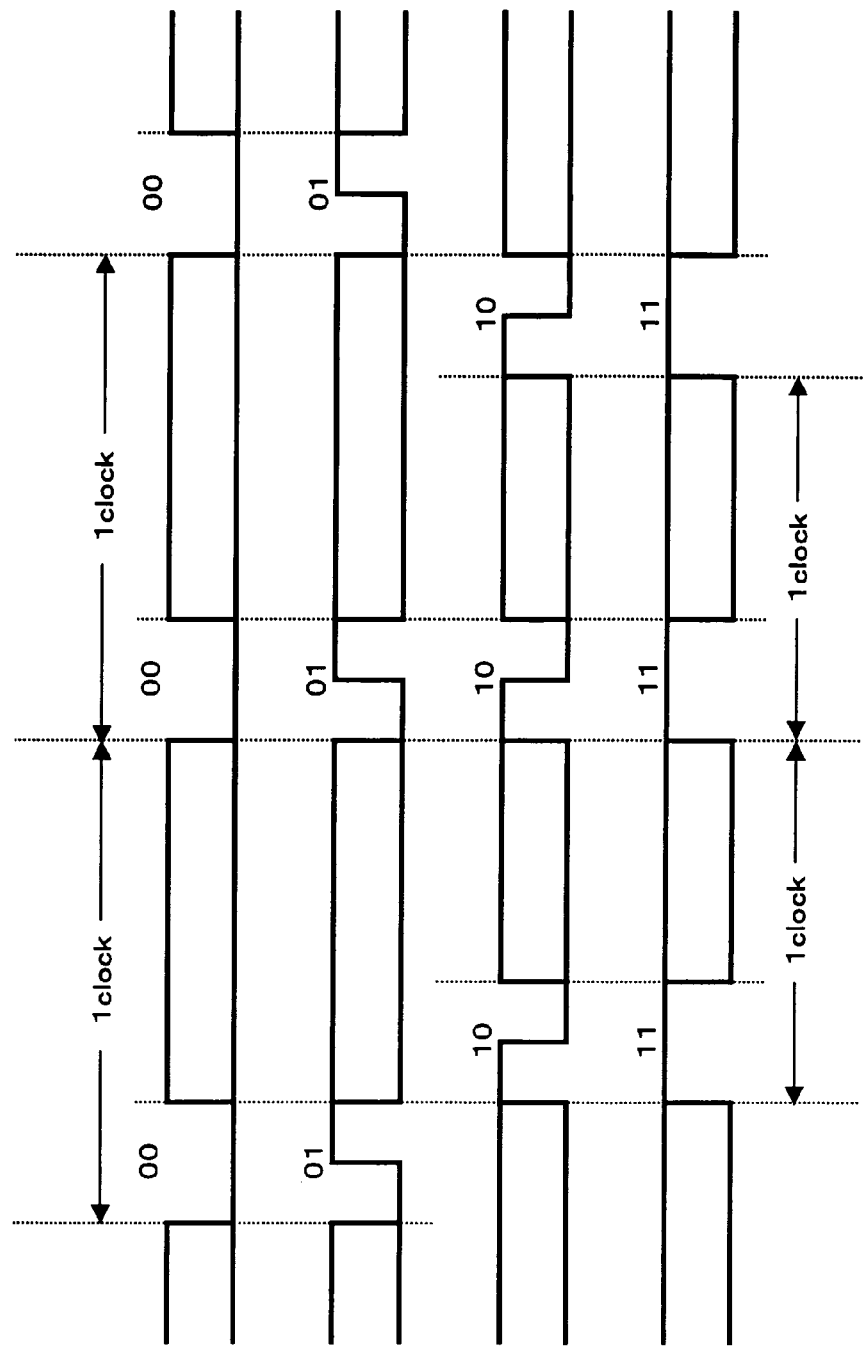

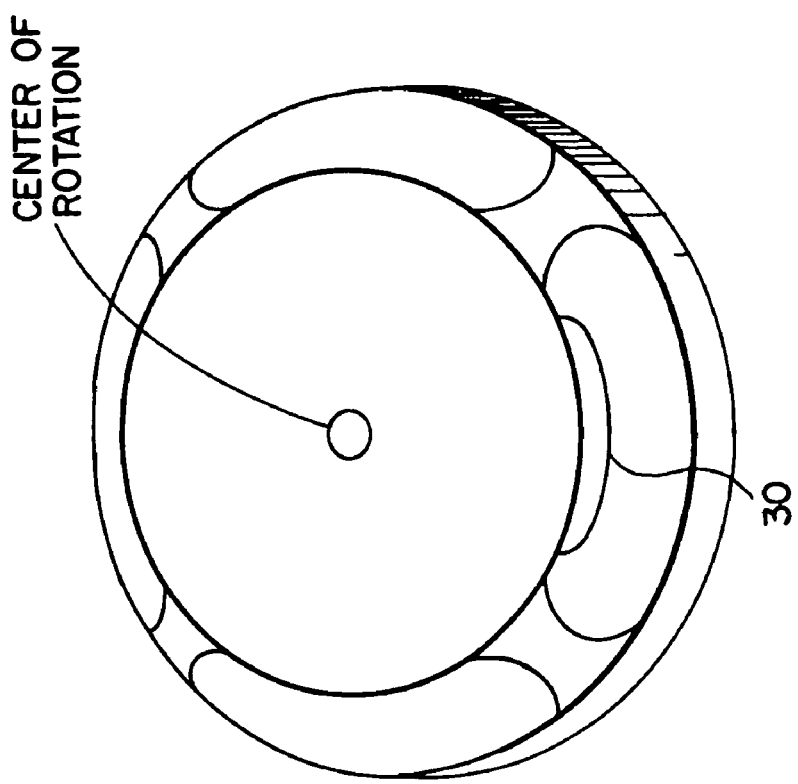
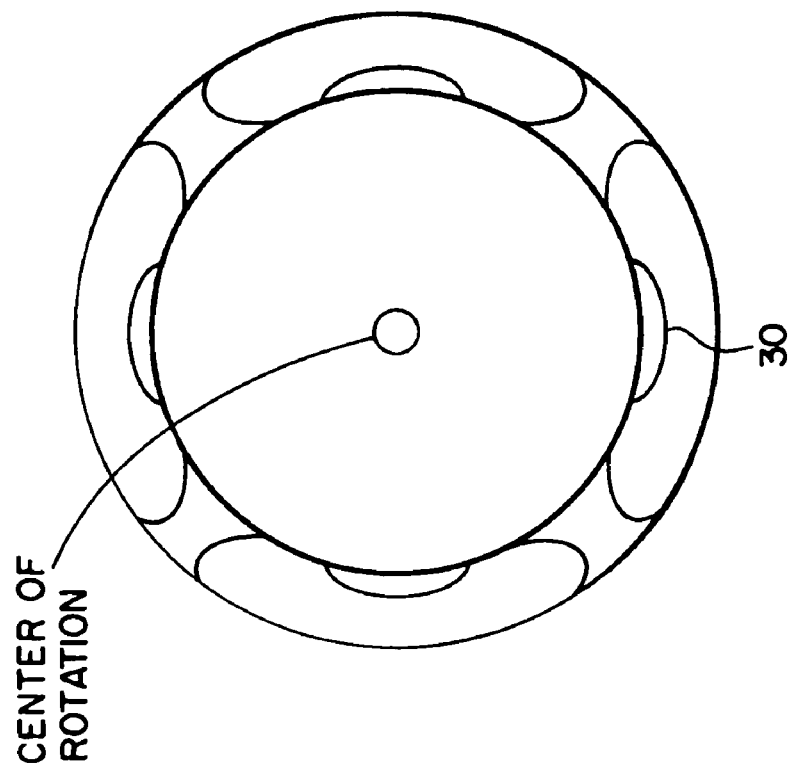

CONTACTLESS CONNECTOR FOR DATA TRANSMISSION INCLUDING ROTATING AND FIXED LIGHT ELEMENTS

CROSS-REFERENCE TO RELATED APPLICATIONS

This application is based upon and claims the benefit of priority from the prior Japanese Patent Application No. 2005-279631, filed on Sep. 27, 2005, the entire contents of which are incorporated herein by reference.

BACKGROUND OF THE INVENTION

1. Field of the Invention

The present invention relates to a contactless connector that sends and receives data contactlessly. More specifically, the present invention relates to a contactless connector in which a light element is provided on a cylindrical rotating body and data are sent and received contactlessly between the light element of the cylindrical rotating body and a light element of a fixed body.

2. Description of the Related Art

The prior art includes multiple-channel contactless data transmission technology (Japanese Patent Application Laid Open No. 2004-116018, for example) that supplies power contactlessly to a rotating body from a fixed body and has no channel interference.

However, when two-way signal transmission is implemented by means of a rotation side and a fixed side, it is necessary to arrange light elements opposite one another in multiple stages, a first stage, which is for transmission, and a second stage, which is for reception, being made to lie opposite one another. A large number of stages is required in order establish multiple channels. This creates problems such as an increased product size and an increase in mass and it is necessary to create a mechanism and circuit substrate for fixing the light elements, as well as a dedicated aperture on the rotation side and fixed side.

SUMMARY OF THE INVENTION

Therefore, the present invention was conceived in view of this problem. An object of the present invention is to provide a contactless connector that establishes a common light element fixing method and facilitates two-way signal transmission of multiple channels by means of single-stage opposition.

In order to achieve the above object, the present invention provides a contactless connector comprising a rotation-side light element that is provided on a rotating body of rotating about an axis of rotation and a fixed-side light element that is provided on a fixed body, data transmission and reception being contactlessly performed between the rotation-side light element and the fixed-side light element, wherein the rotation-side light element and the fixed-side light element are provided on a disk face of the rotating body and a disk face of the fixed body respectively, which are substantially orthogonal to the axis of rotation, and provided oblique with respect to the respective disk faces to form a light path that is oblique with respect to the axis of rotation, further comprising: an aperture that allows light emitted from the rotation-side light element or the fixed-side light element to pass, between the rotating body and the fixed body. As a result, a contactless connector with no interchannel interference that performs two-way transmission of data of multiple channels by means of single-stage opposition, for example, can be provided.

Further, the present invention is the contactless connector, wherein the aperture comprises a plurality of holes that allow the emitted light to be transmitted and the width of each of the holes is a size such that, when a light-receiving element is located at one end of the hole, a light-receiving element is also located at the other end of the hole when one of the light elements is a light-emitting element and the other is a light-receiving element. As a result, light from the light-emitting element can be received by the light-receiving element without interruption, for example.

Furthermore, the present invention is the contactless connector, wherein the width of the hole provided in the aperture is a size such that two of the light-emitting elements at the shortest distance are not simultaneously output to one of the light-receiving elements. As a result, light from the light-emitting element can be received by the light-receiving element continuously without interruption, for example.

Moreover, the present invention is the contactless connector, wherein the rotation-side light element is provided on the rotating body and substantially at the center of the axis of rotation. As a result, light from the light-emitting element can be reliably received by the light-receiving element, for example.

In addition, the present invention is the contactless connector, wherein the rotation-side light element is provided in a plurality on a plurality of concentric circles of different radius in the center of axis of rotation. As a result, data of multiple channels can be sent and received, for example.

Further, the present invention is the contactless connector, comprising switching portion to which data output from the fixed-side light element are input, and which identify which channel the input data belong to and output the data to an output channel that corresponds with the channel. As a result, even when input data of a plurality of channels has been received by the fixed body, for example, the data can be output to designated wiring by identifying which channel the data is from.

Moreover, the present invention is the contactless connector, further comprising: a transformer winding in both of the rotating body and the fixed body, wherein the transformer winding supplies power contactlessly to the rotating body from the fixed body. As a result, power can be supplied to the rotating body contactlessly, for example.

The contactless connector of the present invention makes it possible to provide a contactless connector that contactlessly performs two-way transmission of multiple channel data without interchannel interference as a result of comprising an aperture with a plurality of holes for condensing the light from the light-emitting element by establishing the light paths of light elements that are disposed on the rotating body and fixed body in oblique opposition.

BRIEF DESCRIPTION OF THE DRAWINGS

FIG. 7(A) to 7(D) show an example of data that is input to the light element circuit portion 11;

FIG. 8(A) to 8(D) show an example of data that is input to the light element circuit portion 11;

FIGS. 9(A) and 9(B) show an example of an aperture 30;

DESCRIPTION OF THE PREFERRED EMBODIMENTS

Figure 1:
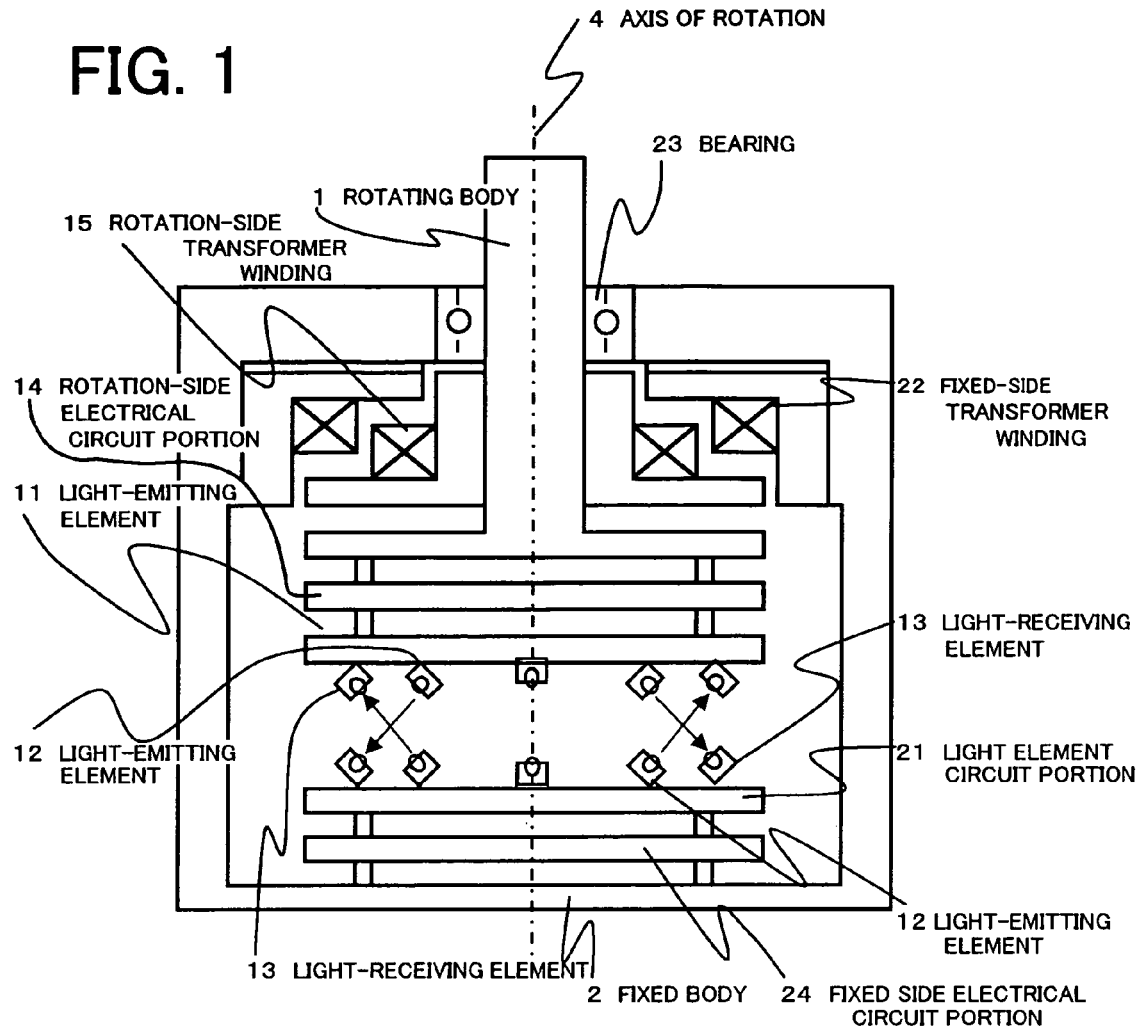
FIG. 1 shows a side view of a contactless connector 10 when disk-shaped light element circuit portions 11 lie opposite one another in one pair.

Preferred embodiments for implementing the present invention will be described hereinbelow with reference to the drawings. FIG. 1 shows the overall constitution of the contactless connector 10 to which the present invention is applied.

Overall, as shown in FIG. 1, the contactless connector 10 comprises principally a rotating body 1 and a fixed body 2. The rotating body 1 is formed as a hollow-like shaft. The rotating body 1 rotates about an axis of rotation 4 as a result of rotational driving by a rotation-side device.

Meanwhile, the fixed body 2 is aligned by means of a bearing 23 and is formed in a cylindrical shape to cover the rotating body 1. The fixed body 2 and rotating body 1 are able to perform data transmissions contactlessly in both directions.

The rotating body 1 comprises a light element circuit portion 11, a light-emitting element 12, a light-receiving element 13, a rotation-side electrical circuit portion 14, and a rotation-side transformer winding 15.

The fixed body 2 comprises the bearing 23, a light element circuit portion 21, the light-emitting element 12, the light-receiving element 13, a fixed side electrical circuit portion 24, and a fixed-side transformer winding 22.

The light element circuit portion 11 on the side of the rotating body 1 and the light element circuit portion 21 on the side of the fixed body 2 comprise a driver, which serves to allow the light-emitting element 12 to emit light, and a multiplexer, which will be described subsequently. The light element circuit portions 11, 21 identify which channel the data produced as a result of light being received by the light-receiving element 13 is from and output each channel to respective designated wiring.

Furthermore, the two light element circuit portions 11, 21 on the rotating body 1 and fixed body 2 respectively comprise the light-emitting element 12 and the light-receiving element 13. Data is transmitted from the light-emitting element 12 and received by the light-receiving element 13. Data is sent and received contactlessly.

As shown in FIG. 1, the light elements 12, 13 on the side of the rotating body 1 are disposed in the order of the light-emitting element 12 and the light-receiving element 13 in the direction from the axis of rotation 4 toward the outer periphery. Similarly also on the side of the fixed body 2, these elements are arranged in the order of the light-emitting element 12 and then the light-receiving element 13. The light element circuit portion 11 on the side of the rotating body 1 and the light element circuit portion 21 on the side of the fixed body 2 are provided opposite one another substantially parallel to the axis of rotation 4 and, therefore, the light-emitting element 12 on the side of the rotating body 1 and the light-emitting element 12 on the side of the fixed body 2 are opposite one another and the light-receiving element 13 on the side of the fixed body 2 and the light-receiving element 13 on the side of the rotating body 1 are also opposite one another.

Further, although the light elements 12, 13 on the side of the rotating body 1 and the light elements 12, 13 on the side of the fixed body 2 are both provided on a disk face that is orthogonal to the axis of rotation 4, the light elements 12, 13 are provided slightly oblique with respect to the disk face. Therefore, a light path that is oblique with respect to the axis of rotation 4 is formed by the light-emitting element 12 on the side of the rotating body 1 and the light-receiving element 13 on the side of the fixed body 2. An oblique light path is likewise formed by the light-receiving element 13 on the side of the rotating body 1 and the light-emitting element 12 on the side of the fixed body 2.

Meanwhile, when attention is directed toward the placement of the light elements 12, 13, the light elements 12, 13 on the side of the rotating body 1 and the light elements 12, 13 on the side of the fixed body 2 are arranged in the order of the light-emitting element 12 and the light-receiving element 13 in the direction from the axis of rotation 4 toward the outer periphery. Therefore, the placement of the light elements 12, 13 provided on the light element circuit portions 11, 21 are the same for the side of the rotating body 1 and the side of the fixed body 2. Accordingly, it is not necessary to create light element circuit portions 11, 21 separately on the rotating body 1 side and the fixed body 2 side. The basic design can therefore be common and the overall costs of the device can be reduced.

Another constitution of the rotating body 1 will be described hereinbelow.

The rotation-side electrical circuit portion 14 is attached to the rotating body 1 and performs respective data processing. For example, when a camera as a rotation-side device is attached to the rotating body 1, the rotation-side electrical circuit portion 14 converts an imaged video into RGB (red, green and blue) three-primary color data and, outputs this data to the fixed body 2 by performing processing such as compression if necessary. Further, the rotation-side electrical circuit portion 14 is also able to process a control command signal for a zoom-up for the camera from the fixed side and to output the control command signal to the camera. A control signal to the camera is data produced as a result of light being received by the light-receiving element 13 of the rotating body 1. Further, in FIG. 1, the rotation-side electrical circuit portion 14 is attached to the top of the light element circuit portion 11 but may also be attached to a rotation-side device that is spaced apart from the rotating body 1, for example, without adherence to such a form.

The rotation-side transformer winding 15 is provided in a position on the outer periphery of the rotating body 1. The rotation-side transformer winding 15 constitutes a rotating transformer together with a fixed-side transformer winding 22 that will be described subsequently, and supplies power from the fixed body 2 to the rotating body 1. As a result, the rotation-side electrical circuit portion 14 and light element circuit portion 11, and necessary the rotation-side device can be made to operate. The supply of power of the rotating transformer will be described subsequently.

Another constitution of the fixed body 2 will be described next.

The fixed side electrical circuit portion 24 is attached to the fixed body 2 and performs respective processing. For example, when video data from the rotating body 1 is compressed, the fixed side electrical circuit portion 24 decompresses the compressed video data into RGB (red, green and blue) three primary color data and outputs this data to a fixed-side monitor or the like. Further, the fixed side electrical circuit portion 24 generates a control command signal for a zoom-up for the camera on the rotation side and outputs the control command signal to the rotating body 1 via the light elements 12, 13. Further, although the fixed side electrical circuit portion 24 is attached below the light element circuit portion 21 in FIG. 1, the fixed side electrical circuit portion 24 may also be attached to a fixed-side device that is spaced apart from the fixed body 2, for example, without adherence to this form.

The fixed-side transformer winding 22 is provided in a position opposite the rotation-side transformer winding 15. The fixed-side transformer winding 22 supplies power that is supplied from the fixed-side device to the rotation-side transformer winding 15 of the rotating body 1.

The bearing 23 is provided in the inner-wall part of the fixed body 2. The fixed body 2 is aligned in the position shown in FIG. 1 by the bearing 23. Further, the bearing 23 is sometimes also not used. For example, the fixed body 2 and rotating body 1 are aligned by connecting the fixed body 2 itself to the fixed-side device, for example.

Figure 2:
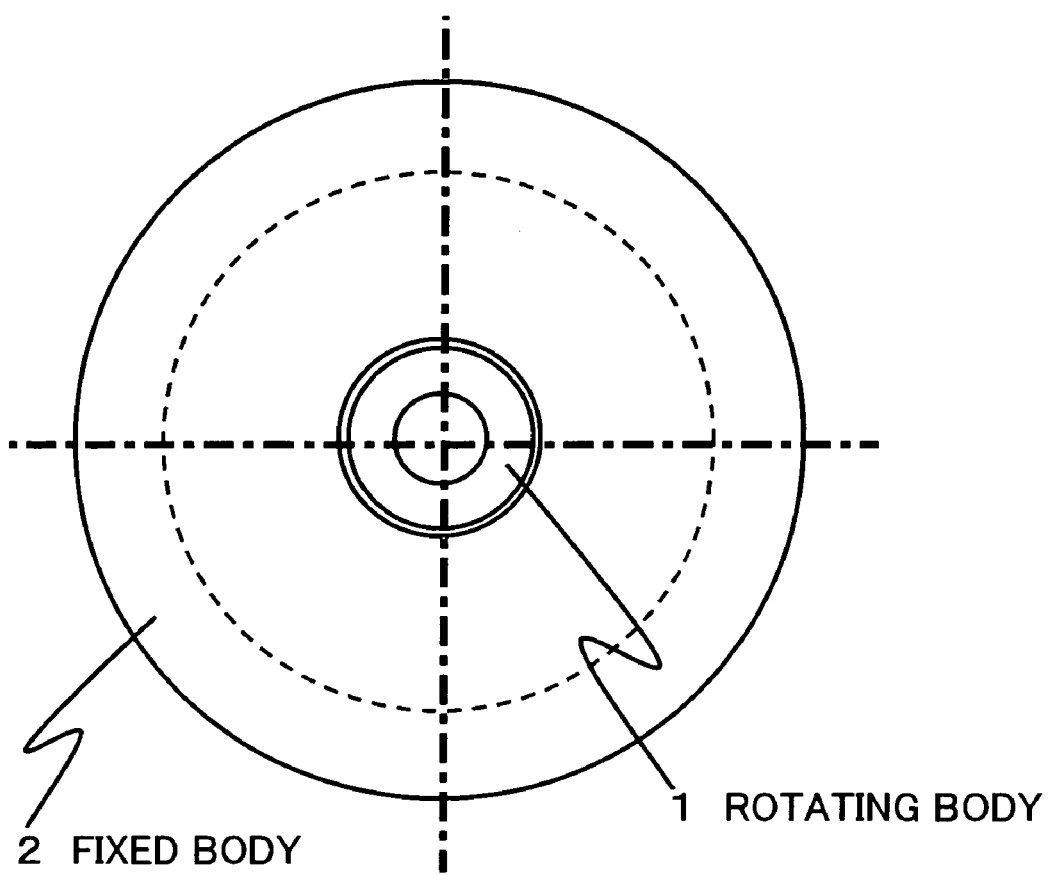
FIG. 2 shows an upper view of the contactless connector 10.

FIG. 2 shows the contactless connector 10 from above. The rotating body 1 and fixed body 2 that constitute the contactless connector 10 are formed circular. The rotating body 1 is provided on the core side of the contactless connector 10 and the fixed body 2 is provided on the outer periphery of the contactless connector 10. The fixed body 2 is actually constituted to cover the rotating body 1 and, when the contactless connector 10 is viewed from the top, the rotating body 1 is hidden by the fixed body 2 and not visible. However, the rotating body 1 is illustrated as per FIG. 2 for the sake of expediency in the description.

Figure 3:
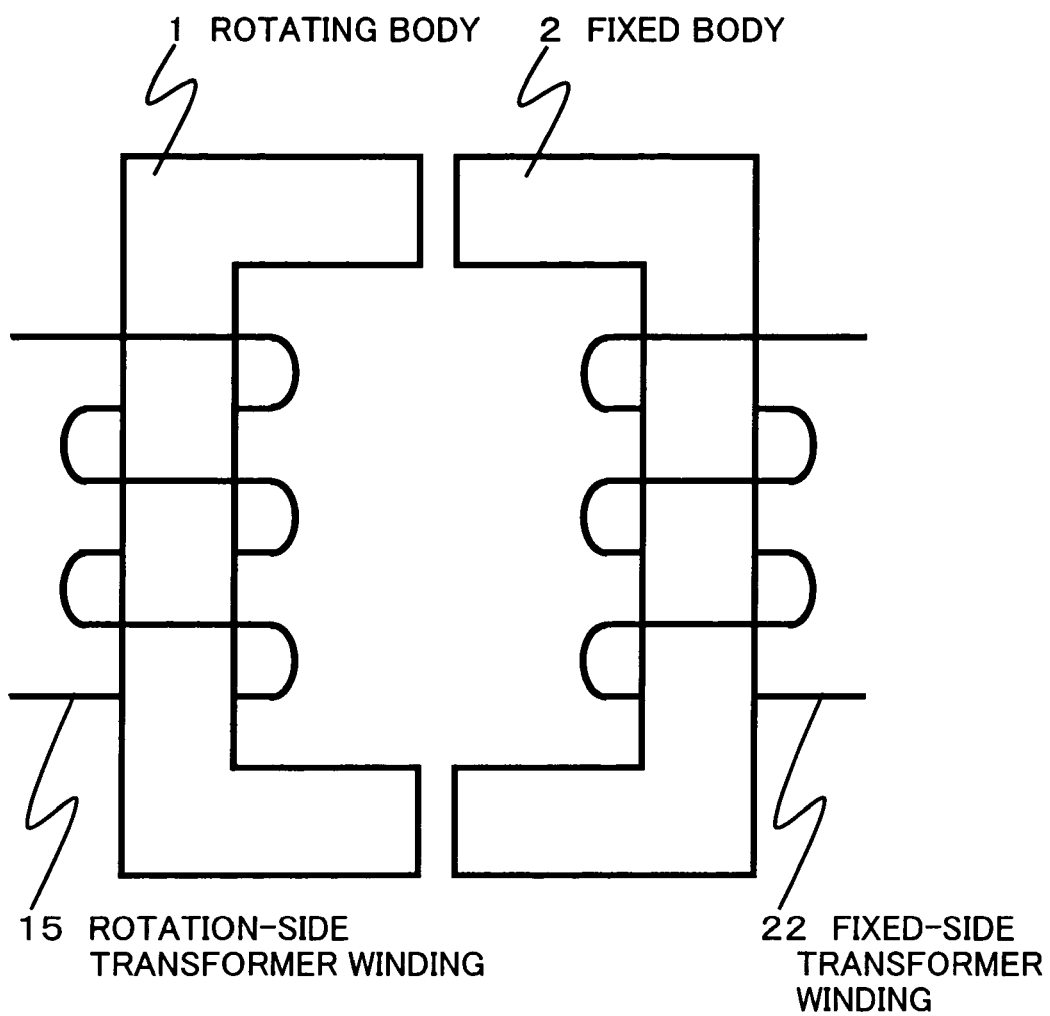
FIG. 3 serves to illustrate the supply of power from a fixed body 2 to a rotating body 1.

FIG. 3 serves to illustrate the supply of power from the fixed body 2 to the rotating body 1. The fixed-side transformer winding 22 of the fixed body 2 is supplied with a supply current from a fixed side device. The fixed-side transformer winding 22 is attached wound about a core on the side of the fixed body 2 and, therefore, an electric field is produced around the core of the fixed body 2 as a result of the flow of current. Because the electric field is conducted by the core of the rotating body 1, a current is produced in the rotation-side transformer winding 15 that is attached wound on the side of the rotating body 1. Therefore, power from the fixed-side device is supplied to the rotating body 1. The power is supplied to the rotation-side electrical circuit portion 14 and light element circuit portion 11. Further, the fixed side electrical circuit portion 24 and light element circuit portion 21 of the fixed body 2 are directly supplied with power from the fixed-side device.

Figure 4:
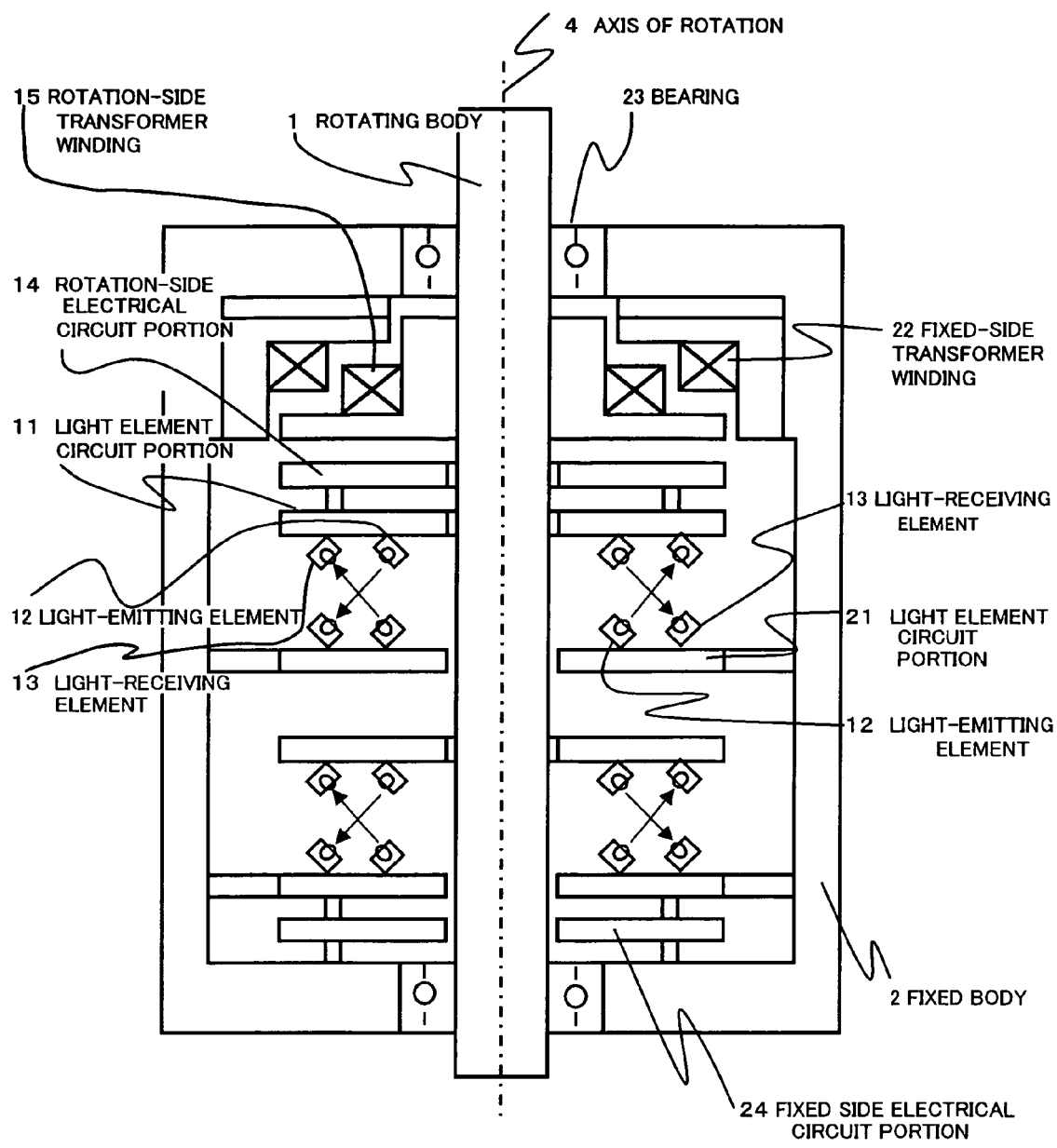
FIG. 4 shows a side view of the contactless connector 10 when a plurality of hollow disk-shaped light element circuit portions 11 lie opposite one another.

FIG. 4 shows a multiple-channel aspect of the contactless connector 10. The connector 10 shown in FIG. 4 is constituted such that the hollow shaft of the rotating body 1 penetrates the connector 10.

The light element circuit portion 11 on the side of the rotating body 1 is formed in a hollow disk shape the inside diameter part of which is fixed to the shaft. Meanwhile, the light element circuit portion 21 on the side of the fixed body 2 is also formed in a disk shape, the outside diameter part of which is fixed to the side of the fixed body 2. Further, the fixed-side light element circuit portion 21 is provided opposite the rotation-side light element circuit portion 11 substantially parallel to the axis of rotation 4.

Further, the other parts of the rotating body 1 and fixed body 2 and so forth have substantially the same constitution as those in FIG. 1. However, the difference is that the bearing 22 is attached to the two ends of the fixed body 2. This is in order to suppress shaking and fluctuations of the rotating body 1. If sufficient accuracy and strength is secured by a single axle, one bearing 23 is acceptable.

Here, when the light element circuit portion 11 is provided below the disk of the rotating body 1 as per FIG. 1, the number of the light-emitting element 12 and light-receiving element 13 is limited by the surface area of the disk. Although data of one channel can be transmitted by one light-emitting element 12 and one light-receiving element 13 that lie opposite one another, the numbers of the light-emitting element 12 and light-receiving element 13 are restricted and the number of channels of handled data is limited.

Meanwhile, the light element circuit portions 11, 21 are formed with a hollow-like disk shape as shown in FIG. 4 and, as the cylinder installed in multiple stages is made longer, the number of the light-emitting elements 12 and light-receiving elements 13 can be increased. Accordingly, the act of making the light element circuit portions 11, 21 a hollow-like disk shape as shown in FIG. 4 rather than making the light element circuit portions 11, 21 shown in FIG. 1 a disk shape allows the number of channels to be increased.

In recent years, because the amount of data handled by devices has increased, although multiple channels are required even by the contactless connector 10, such two-way data transmission of multiple channels can be easily performed by making the light element circuit portions 11, 21 a hollow-like disk shape.

Figure 5:
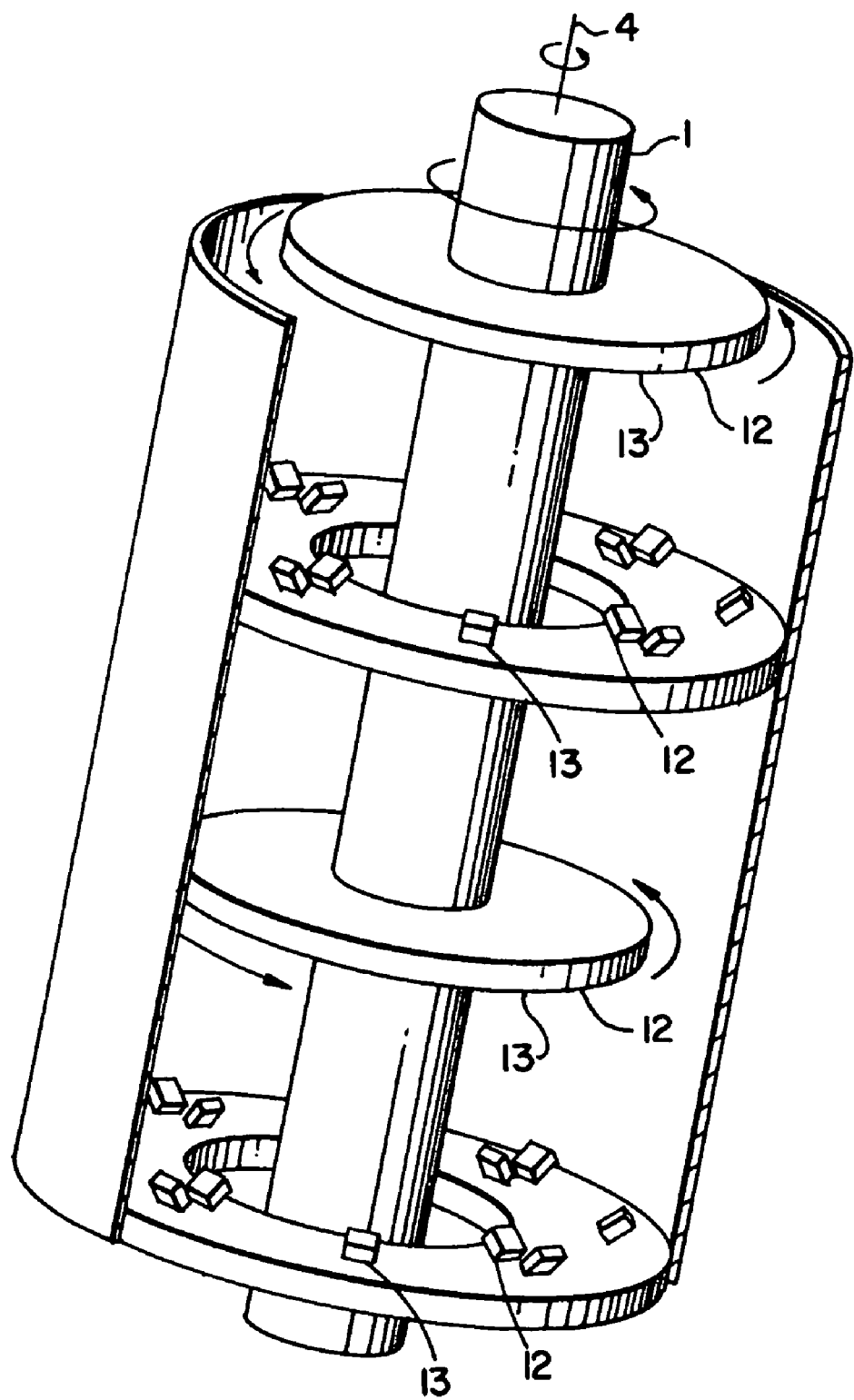
FIG. 5 shows a perspective view of the contactless connector 10 when a plurality of hollow disk-shaped light element circuit portions 11 lie opposite one another.

FIG. 5 shows a perspective view of the contactless connector 10 with a multiple-stage constitution. However, for the sake of expediency in the description, only the light-emitting element 12 and light-receiving element 13 of the fixed-side light element circuit portion 21 are shown.

As in the case of FIG. 1, the light elements 12, 13 on the sides of the rotating body 1 and fixed body 2 respectively are provided obliquely with respect to the disk face of the light element circuit portions 11, 21 that are orthogonal to the axis of rotation 4. Accordingly, the respective light elements 12, 13 form a light path that is oblique with respect to the axis of rotation 4.

A contactless connector 10 with a multi-stage constitution constitutes the oblique light path in two stages and forms light paths for more channels than the light paths shown in FIG. 1. Naturally, if light paths are formed in three of stages or in a larger plurality of stages, a contactless connector 10 of an even greater number of channels can be constituted.

Because the placement of the light elements 12, 13 on the side of the rotating body 1 and the light elements 12, 13 on the side of the fixed body 2 are also common in the case of a contactless connector 10 with a multi-stage constitution, the light element circuit portions 11, 21 can be common to both the side of the rotating body 1 and the side of the fixed body 2. Therefore, as per a case with a single-stage constitution, the costs of the contactless connector 10 can be reduced. Moreover, the light element circuit portions 11, 21 can be common to all the stages even when there are plural stages and the cost reduction effect is large.

Figure 6:
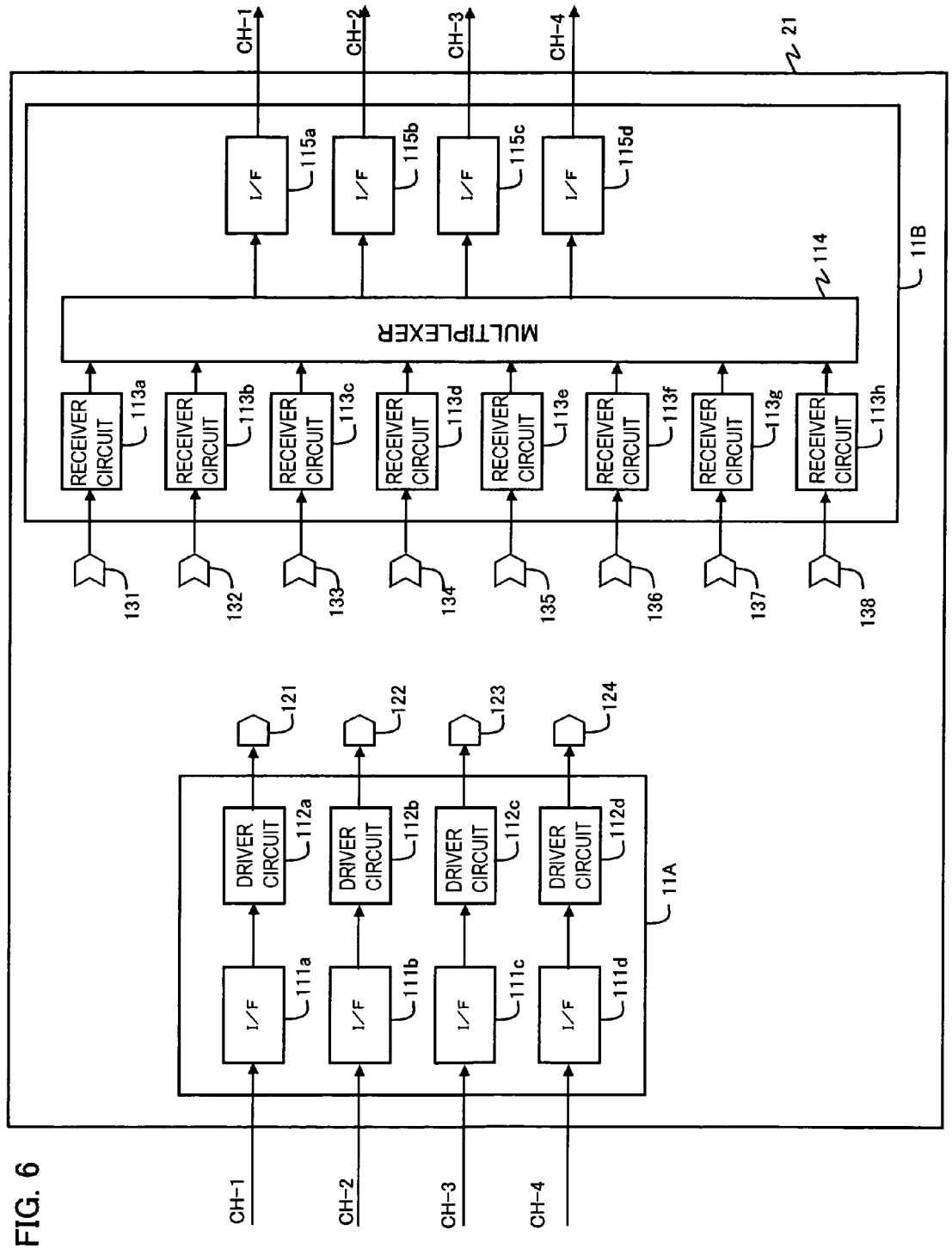
FIG. 6 shows a constitutional view of a light element circuit portion 11.

FIG. 6 shows the specific constitution of the light element circuit portion 11. FIG. 6 shows an example of a case where data of four channels is sent and received. The light element circuit portions 11, 21 comprise broadly a driver block 11A of the light-emitting element 12 and a receiver block 11B of the light-receiving element 13.

The driver block 11A will be described first. The driver block 11A comprises four interface (I/F) circuits 111*a* to 111*d* and four driver circuits 112*a* to 112*d*.

Each of the I/F circuits 111*a* to 111*d* has data input thereto from the device side and converts this data into data that can be processed by the light element circuit portions 11, 21. The contactless connector 10 shown in FIG. 6 is able to process data of four channels and, therefore, the I/F circuits 111a to 111d (four in total) are provided in correspondence with the respective channels.

The driver circuits 112a to 112d are circuits that generate drive data for driving the light-emitting element 12. The data output from the interface circuits 111a to 111d are input to the driver circuits 112a to 112d which generate drive data to correspond with the input data. The driver circuits 112a to 112d also exist in a number (four in total) that corresponds with the number of input channels. The generated drive data are supplied to light-emitting elements 121 to 124.

The light-emitting elements 121 to 124 emit light that corresponds with drive data in accordance with O/E conversion or the like on the basis of the drive data from each of the driver circuits 112a to 112d (four in this embodiment).

The light-receiving elements 131 to 138 are constituted by a number of light elements that is equal to or more than the number of light-emitting elements 121 to 124 so that the light from the light-emitting elements 121 to 124 can be reliably received without interruption when the rotating body 1 is rotating. In the case of FIG. 6, the light-receiving elements are constituted by eight light elements 131 to 138. The light from the opposite light-emitting elements 121 to 124 may be received by any of the light-receiving elements 131 to 138. For example, the light from the light-emitting elements 121 may be received by the light-receiving element 131 or by the light-receiving element 135.

The receiver block 11B will be described next. The receiver block 11B comprises the respective light-receiving elements 131 to 138, receiver circuits 113a to 113h that are connected to each of the light-receiving elements 131 to 138, a multiplexer 114, and interface (I/F) circuits 115a to 115d.

The receiver circuits 113a to 113h are connected to the light-receiving elements 131 to 138 respectively and connected to the multiplexer 114, and light-reception signals from the light-receiving elements 131 to 138 are input to the receiver circuits 113a to 113h. The receiver circuits 113a to 113h convert the light-reception signals to data that can be processed by the receiver block 11B, and output converted data to the multiplexer 114. In the example of FIG. 6, the receiver circuits 113a to 113h are constituted by eight circuits in order to correspond with the eight light-receiving elements 131 to 138.

The multiplexer 114 inputs data from the respective receiver circuits 113a to 113h and serves to switch the input data so that each of the data can be supplied to the output stage of the corresponding channel. The multiplexer 114 is actually constituted by a plurality of logic circuits. In the example of FIG. 6, because the contactless connector 10 is able to transmit and receive four channels' worth of data, the multiplexer 114 has four corresponding output stages.

The I/F circuits 115a to 115d inputs data supplied from the multiplexer 114 convert this data to data that can be output to the outside. In the case of this example, the multiplexer 114 has four output stages and, therefore, four interface circuits exist. Further, the respective I/F circuits 115a to 115h output input data to output stages that correspond with the channels. The respective data of CH-1, CH-2, CH-3, and CH-4 are output in order starting from the top in FIG. 6.

An operation that includes the respective blocks 11A and 11B of the electric circuit portion constituted as above will be described while suitably using FIGS. 7(A) to 7(D), FIGS. 8(A) to 8(D), and so forth.

First, when the power supply is turned ON in the fixed-side device, power is supplied to the fixed side electrical circuit portion 24 and light element circuit portion 21 of the fixed body 2. Power is also supplied to the fixed-side transformer winding 22 and, as mentioned above, power is supplied to the rotation-side transformer winding 15 of the rotating body 1. As a result, the rotation-side electrical circuit portion 14 and the light element circuit portion 11 mounted on the rotation side are driven.

Further, the rotating body 1 of the connector 10 rotates as a result of the rotation-side device being driven. For example, if the rotation-side device is a camera capable of rotating 360°, the camera itself rotates in order to image a video and the rotating body 1 also rotates. Further, when data is supplied from the rotation-side device to the contactless connector 10, data is input to the light element circuit portion 11. Examples of the data are shown in FIGS. 7(A) to 7(D), and FIGS. 8(A) to 8(D).

The example in FIG. 7(A) to 7(D) are an example in which data that are different for channel 1 (CH-1) and channel 3 (CH-3) (video and audio data respectively, for example) are input. Further, clock data for synchronization of the data of channel 1 and channel 3 respectively with channel 2 (CH-2) and channel 4 (CH-4) are input. Thus, data that are different for each channel are generated and input to the contactless connector 10. Further, the generation of such data and the division of the data of each channel may be performed by the rotation-side electrical circuit portion 14 or may be performed by a processing circuit that is the rotation-side device.

The data of each channel are inputted to the respective driver circuits 112a to 112d via the respective I/F 111a to 111d of the light element circuit portions 11. Here, the driver circuit 112b to which the data of channel 2 is input performs processing to raise the level of the data from the input level to a high predetermined level (to a level two times the previous level, for example). As a result, the multiplexer 114 is able to identify which data of the data received by any of the light elements 131 to 138 of the fixed body 2 is the data of channel 2.

And light that is received by the fixed-side light elements (light-receiving elements) 131 to 138 can be identified as being of a particular channel from the placement on the disk of the rotation-side light elements (light-emitting elements) 121 to 124. Suppose that data of channel 2 is emitted from the light-emitting element 122 and received by the light-receiving element 132, for example. Here, supposing that the dispositional relationship of the light-emitting elements is such that the light-emitting elements are disposed clockwise on a disk in the order of the light-emitting element 121 of channel 1, the light-emitting element 122 of channel 2, the light-emitting element 123 of channel 3, and then the light-emitting element 124 of channel 4, for example, it can be identified that the data produced as a result of the light received by the light-emitting element 134 is the data of channel 3, the data produced as a result of the light received by the light-receiving element 136 is the data of channel 4, and the data produced as a result of the light received by the light-receiving element 138 is the data of channel 1.

As a result of constituting the multiplexer by means of logic circuits, the data of each channel can be identified and output to each channel on the corresponding output side. Naturally, the level of channel 2 is similarly set higher than the level of the channels excluding channel 2.

Drive data for driving the rotation-side light elements 121 to 124 is supplied from the drive circuits 112a to 112d. Further, elements 121 to 124 emit light on the basis of the drive data and light is received by any of the fixed-side elements 131 to 138. Further, the receiving light data is input to a multiplexer 232 via the respective receiver circuits 113a to 113h as mentioned earlier, switched to correspond with the respective channels, and output from the respective designated output stages to the outside via the I/F 115*a* to 115*d*.

In the example above, the channels are identified as a result of setting the data of any one channel among the input data as different from the data levels of the other channels and it is determined which channels the respective data belong to from the dispositional relationship of the elements 121 to 124. Otherwise, the data of the respective channels can be identified from the data shown in FIG. 8(A) to 8(D). That is, the data for channel identification is inserted in the header of the data of the respective channels to cause light to be emitted from the light-emitting elements 121 to 124, whereby the fixed-side multiplexer 114 is also able to identify which data belongs to which channel.

As shown in FIG. 8(A) to 8(D), light is emitted from the light-emitting elements 121 to 124 as a result of a 2-bit identification code being added to the header of the respective data of each channel. As per FIG. 7(A) to 7(D), light that is emitted from the light-emitting elements 121 to 124 is received by any of the elements 131 to 138 of the light-receiving elements 131 to 138. The data that is input to the multiplexer 114 via the receiver circuits 113*a* to 113*h* then identifies from the identification code which channel the received data belongs to.

More specifically, as shown in FIG. 8(A) to 8(D), the data of the first channel is added to the data header when the identification code is "00" (FIG. 8(A)), the data of the second channel is added to the data header when the identification code is "01" (FIG. 8(B)), the data of the third channel is added to the data header when the identification is "10" (FIG. 8(C)), and the data of the fourth channel is added to the data header when the identification code is "11" (FIG. 8 (D)). The multiplexer 114 switches the input data to output the output to the I/F 115*a* for data of the first channel when the identification code is "00". Likewise, the second channel is output to the I/F 115*b*, the third channel is output to the I/F 115*c*, and the fourth channel is output to the I/F 115*d*. The identification code is added to the header of the one clock's worth of data as shown in FIG. 8(A) to 8(D).

Such channel identification code codes may be implemented by a data processing circuit of the rotation-side device or may be added by the rotation-side electrical circuit portion 14. Further, the respective channels may be identified from the dispositional relationship of the light-emitting elements 121 to 124 by adding an identification code to the data of any one of a plurality of channels rather than adding an identification code to the respective data of all the channels. In addition, the addition of an identification code may be added every predetermined number of clocks rather than at every clock and may be added to the respective frame headers of the video data, for example.

Thus, by making the data level different for only a certain channel and adding a channel identification number, when data of multiple channels is received on the fixed side, it can be determined which channel data belongs to and the data can be output to a predetermined output stage, whereby it is possible to respond to the demand for multiple channels of the contactless connector 10.

A contactless connector 10 in which the aperture 30 is provided on the light element circuit portion 21 will be described next. An example of the aperture 30 is shown in FIGS. 9(A) and 9(B). As mentioned earlier, as a result of the placement when a plurality of light-emitting elements 121 to 124 are provided on the light element circuit portions 11, 21, light that is emitted from the light-emitting element 121, for example is sometimes input at the same time to the plurality of light-receiving elements 131 to 138 rather than to one of the light-receiving elements 131 to 138. The so-called interchannel interference problem is sometimes produced and the light element circuit portions 11, 21 that receive light is sometimes unable to identify which channel the data produced as a result of receiving light belongs to. Therefore, the aperture 30 is provided on the light element circuit portion 21 so that light from one of the light-emitting elements 121 to 124 is received by one of the light-receiving elements 131 to 138.

FIG. 9(A) shows the aperture 30 from above. A plurality of holes is provided along a circumference with the same radius and light from the light-emitting elements 121 to 124 is output from each of the holes. This is because interchannel interference in this case is produced between light-receiving elements 131 to 138 that exist on the same radius.

FIG. 9(B) is a perspective view of the aperture 30. The aperture 30 has a constant thickness that serves not to prevent the rotation of the rotating body 1 and fixed body 2.

Figure 10A:
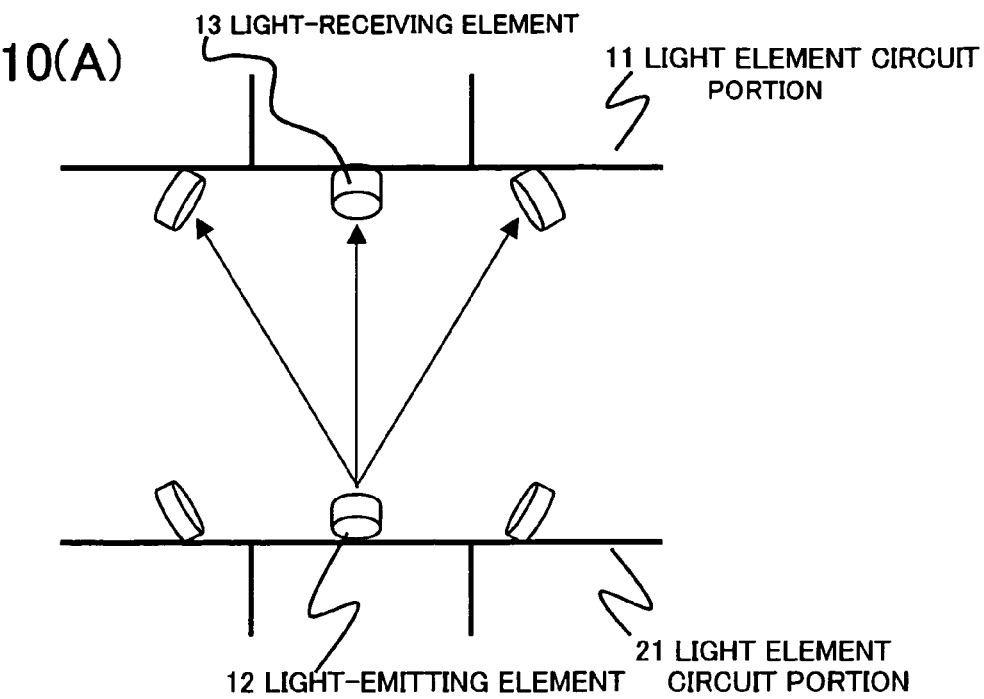
FIG. 10 shows an example of a light path from a light-emitting element 12 to a light-receiving element 13.
Figure 10B:
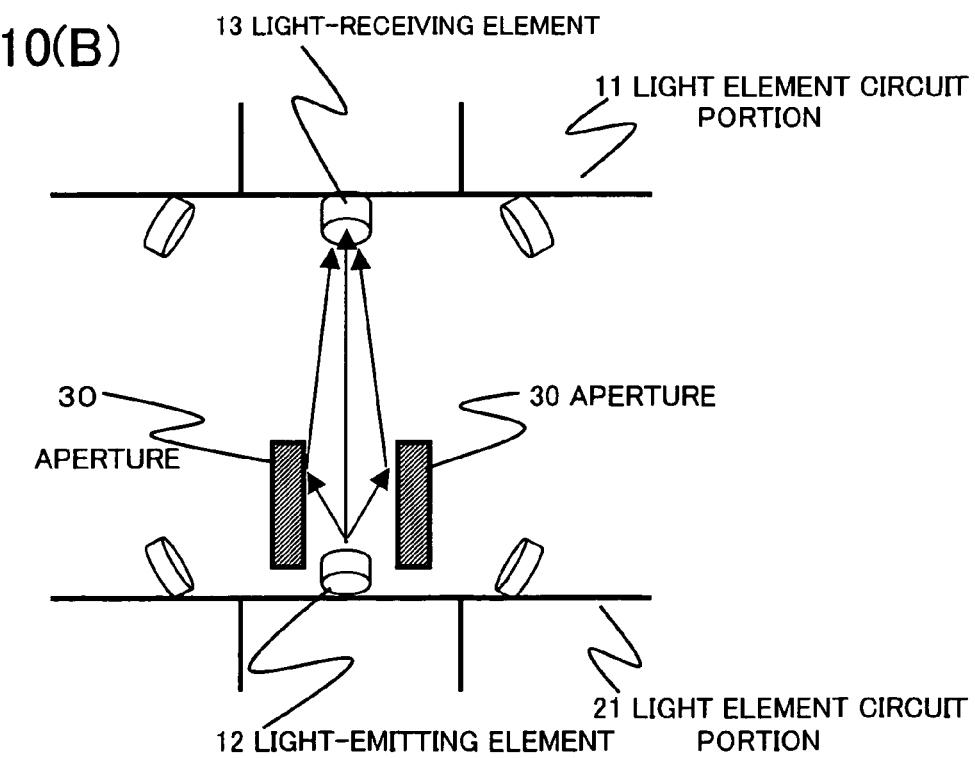

FIGS. 10(A) and 10(B) serves to illustrate the difference in the light beam when the aperture 30 in FIG. 1 and FIG. 4 is provided and when the aperture 30 is not provided in FIGS. 1 and 4. As shown in FIG. 10(A), when the aperture 30 is not provided, light emitted from the light-emitting element 12 is received by the three light-receiving elements 13 as a result of the disturbance of light. The problem of so-called interchannel interference is produced. Meanwhile, when the aperture 30 is provided as shown in FIG. 10(B), although the light from the light-emitting element 12 is disturbed, the light is reflected by the inner face of the hole of the aperture 30 and is condensed on the light-receiving element 13. Therefore, the light from the light-emitting element 12 can be reliably received by the light-receiving element 13. In other words, one light-receiving element 13 does not simultaneously receive different light from two light-emitting elements 12.

Further, the height of the aperture 30 (thickness of the aperture 30) may be the height of the gap between the rotating body 1 and fixed body 2 so that all the light from the light-emitting element 12 is reflected, but there is then the risk that the rotation of the rotating body 1 will be disturbed. The light-emitting element 12 and light-receiving element 13 are mounted on the light element circuit portions 11, 21, therefore, the aperture 30 preferably has a thickness that is equal to or less than ½ the gap between the light element circuit portion 11 of the rotating body 1 and the light element circuit portion 21 of the fixed body 2.

In addition, the width of the hole of the aperture 30 may be a width such that, when one light-receiving element 13 is located at one end of the hole, another light-receiving element 13 is located at the other end of the hole, as a result of the rotation of the rotating body 1. This is because any light-receiving element 13 reliably receives light rather than light from the light-emitting element 12 being interrupted while the rotating body 1 is rotating.

Here, the two light-receiving elements 13 simultaneously receive light from one light-emitting element 12. However, by selecting either of two data received simultaneously by the multiplexer 114 of the light element circuit portion 11,21 and constituting a logic circuit to result in an "OR" of the two received data, the problem of interchannel interference does not occur.

Although a plurality of light-emitting elements 12 are arranged on circumferences of the same radius in the above example, because the problem of interchannel interference is not produced, it is also possible to arrange a plurality of light-emitting elements 12 on circumferences of different radii.

Figure 11:
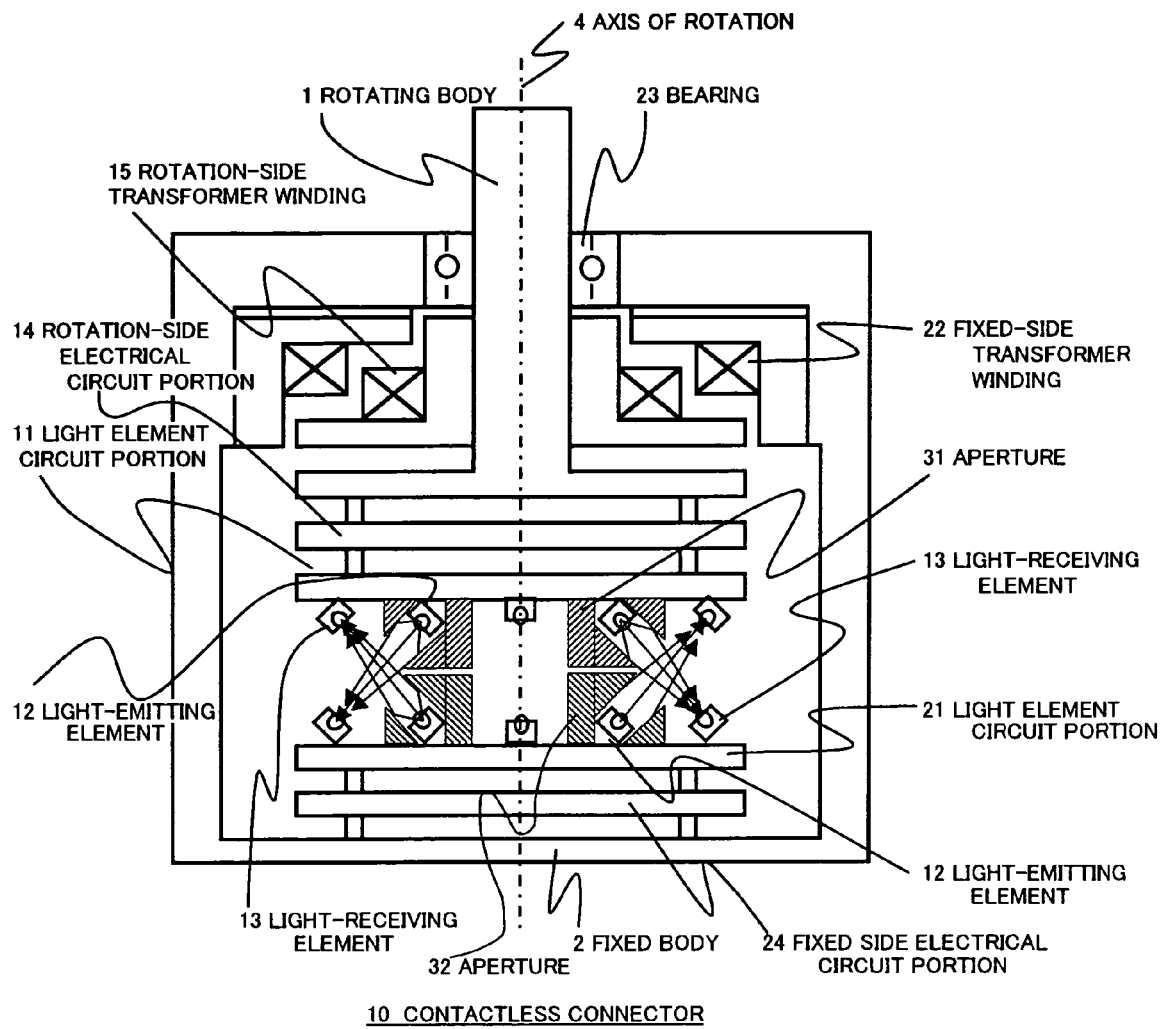
FIG. 11 shows a side view of the contactless connector when the aperture 30 is provided.

FIG. 11 shows an example of the overall constitution of the contactless connector 10 comprising an aperture 31, 32. The aperture 31 on the side of the rotating body 1 is disposed in a downward direction where the fixed body 2 is located and the aperture 32 on the side of the fixed body 2 is disposed in the upward direction where the rotating body 1 is located.

As per FIG. 1 and so forth, in this example, an oblique light path is formed and the disposition of the light elements 12 and 13 is the same for both the light element circuit portion 11 on the side of the rotating body 1 and the light element circuit portion 21 on the side of the fixed body 2, and can be common. Further, light that is emitted from the light-emitting element 12 is condensed on a predetermined light-receiving element 13 by the aperture 31, 32, therefore, the problem of interchannel interference as a result of light being received by another light-receiving element 13 is not produced.

In the example shown in FIG. 11, the oblique light path with a single-stage constitution is formed but a constitution with a plurality of stages as per FIG. 4 is also possible. A contactless connector 10 that permits cost reductions because the light element circuit portion 11, 21 is common to a plurality of stages, with which the problem of interchannel interference is not produced, and which is able to send and receive data of multiple channels can be implemented.

In all the above examples, the arrangement of the light elements 12 and 13 is in the order of the light-emitting element 12 and then the light-receiving element 13 in a direction from the axis of rotation 4 toward the outside but may naturally be the opposite. In this case also, exactly the same operating results were exhibited as for the above example.

What is claimed is:

1. A contactless connector comprising:
    a rotation-side light element that is provided on a rotating body for rotating about an axis of rotation; and
    a fixed-side light element that is provided on a fixed body,
    wherein data transmission and reception is contactlessly performed between the rotation-side light element and the fixed-side light element because the rotation-side light element consists of one of a light-emitting element or a light receiving element and the fixed-side light element consists of the other of a light-emitting element or a light-receiving element,
    wherein the rotation-side light element and the fixed-side light element are provided on a disk face of the rotating body and a disk face of the fixed body respectively, which are substantially orthogonal to the axis of rotation, and provided oblique with respect to the respective disk faces to form a light path that is oblique with respect to the axis of rotation,
    the contactless connector further including an aperture that allows light emitted from the rotation-side light element or the fixed-side light element to pass, between the rotating body and the fixed body,
    wherein the aperture comprises a plurality of holes, extending obliquely with respect to the disk faces, that allow the emitted light to be transmitted and the width of each of the holes is a size such that, when a light-receiving element is located at one end of the hole, a light-receiving element is also located at the other end of the hole when one of the light elements is the light-emitting element and the other is the light-receiving element.

2. The contactless connector according to claim 1, wherein the width of the hole provided in the aperture is a size such that two of the light-emitting elements at the shortest distance are not simultaneously output to one of the light-receiving elements.

3. The contactless connector according to claim 1, wherein the rotation-side light element is provided on the rotating body and substantially at the center of the axis of rotation.

4. The contactless connector according to claim 1, wherein the light element is provided in a plurality on concentric circles of different radius in the center of the axis of rotation.

5. The contactless connector according to claim 1, further comprising:
    a switching portion to which data output from the fixed-side light element are input, and which identify which channel the input data belong to and output the data to an output channel that corresponds with the channel.

6. The contactless connector according to claim 1, further comprising:
    a transformer winding in both of the rotating body and the fixed body,
    wherein the transformer winding supplies power contactlessly to the rotating body from the fixed body.

* * * * *